United States Patent
Sato

(10) Patent No.: US 7,483,244 B2
(45) Date of Patent: Jan. 27, 2009

(54) HELICAL SCAN TAPE SYSTEM WITH PARTICULAR DISTANCE BETWEEN MR ELEMENT AND SHIELD LAYERS

(75) Inventor: Takanori Sato, Miyagi (JP)

(73) Assignee: Sony Corporation, Tokyo (JP)

( * ) Notice: Subject to any disclaimer, the term of this patent is extended or adjusted under 35 U.S.C. 154(b) by 411 days.

(21) Appl. No.: 11/213,525

(22) Filed: Aug. 26, 2005

(65) Prior Publication Data
US 2006/0050443 A1 Mar. 9, 2006

(30) Foreign Application Priority Data
Sep. 7, 2004 (JP) ............... P2004-259838

(51) Int. Cl.
G11B 5/39 (2006.01)
(52) U.S. Cl. ...................... 360/319; 360/271
(58) Field of Classification Search ............... 360/319, 360/324, 271.5, 271
See application file for complete search history.

(56) References Cited

U.S. PATENT DOCUMENTS

| | | | | |
|---|---|---|---|---|
| 4,742,413 A * | 5/1988 | Schewe | ............... | 360/125.03 |
| 5,875,083 A * | 2/1999 | Oniki et al. | ............... | 360/135 |
| 5,940,238 A * | 8/1999 | Nayak et al. | ............... | 360/76 |
| 6,172,857 B1 * | 1/2001 | Inaguma et al. | ............... | 360/271 |
| 6,243,240 B1 * | 6/2001 | Ozue et al. | ............... | 360/281.4 |
| 6,356,406 B1 * | 3/2002 | Takano et al. | ............... | 360/81 |
| 6,400,527 B1 * | 6/2002 | Gochou et al. | ............... | 360/126 |
| 6,456,461 B1 * | 9/2002 | Sato | ............... | 360/126 |
| 6,459,543 B1 * | 10/2002 | Sasaki | ............... | 360/126 |
| 6,477,018 B1 * | 11/2002 | Terunuma | ............... | 360/317 |
| 6,620,483 B2 * | 9/2003 | Kasuga et al. | ............... | 428/98 |
| 6,657,824 B1 * | 12/2003 | Onuma | ............... | 360/319 |
| 6,690,554 B2 * | 2/2004 | Aoki et al. | ............... | 360/324.12 |
| 6,704,174 B2 * | 3/2004 | Soda et al. | ............... | 360/323 |
| 6,934,130 B2 * | 8/2005 | Ikarashi | ............... | 360/324.1 |
| 7,130,161 B2 * | 10/2006 | Kikuiri | ............... | 360/313 |
| 7,193,822 B2 * | 3/2007 | Shimizu et al. | ............... | 360/324.1 |
| 7,365,948 B2 * | 4/2008 | Nakabayashi et al. | ............... | 360/324.1 |
| 2001/0028539 A1 * | 10/2001 | Kikuiri | ............... | 360/320 |
| 2002/0080533 A1 * | 6/2002 | Ozue et al. | ............... | 360/313 |
| 2002/0105752 A1 * | 8/2002 | Soda et al. | ............... | 360/90 |
| 2002/0114110 A1 * | 8/2002 | Katakura et al. | ............... | 360/321 |
| 2002/0159173 A1 * | 10/2002 | Ishida et al. | ............... | 360/17 |
| 2003/0107849 A1 * | 6/2003 | Ikarashi | ............... | 360/324.1 |
| 2004/0184198 A1 * | 9/2004 | Tetsukawa et al. | ............... | 360/324.1 |
| 2004/0252417 A1 * | 12/2004 | Hasegawa et al. | ............... | 360/324.11 |
| 2004/0257687 A1 * | 12/2004 | Ishida et al. | ............... | 360/17 |
| 2004/0264063 A1 * | 12/2004 | Osaki et al. | ............... | 360/313 |

(Continued)

FOREIGN PATENT DOCUMENTS

JP 2003-059007 2/2003

(Continued)

Primary Examiner—Brian E Miller
(74) Attorney, Agent, or Firm—Rockey, Depke & Lyons LLC; Robert J. Depke

(57) ABSTRACT

In a helical scanning tape system including a magnetoresistive head; and a magnetic recording medium having a magnetic layer formed by oblique evaporation on a long nonmagnetic support, a signal being read with the magnetoresistive head by helical scanning, the track width of the magnetoresistive head is 0.5 to 0.8 μm, the distance between shields is 0.13 to 0.145 μm, and sensitivity is 1,862 μVp-p or more.

12 Claims, 6 Drawing Sheets

U.S. PATENT DOCUMENTS

2005/0207069 A1* 9/2005 Suda .......................... 360/323
2006/0050443 A1* 3/2006 Sato .......................... 360/319
2006/0061913 A1* 3/2006 Sekiguchi et al. ........... 360/323
2006/0066997 A1* 3/2006 Murao et al. ................ 360/128
2006/0067000 A1* 3/2006 Doushita ................... 360/134
2006/0067011 A1* 3/2006 Soda et al. ................ 360/324.1
2007/0159722 A1* 7/2007 Kuse et al. .................. 360/134

FOREIGN PATENT DOCUMENTS

JP    2004-185734    7/2004

* cited by examiner

FIG. 4
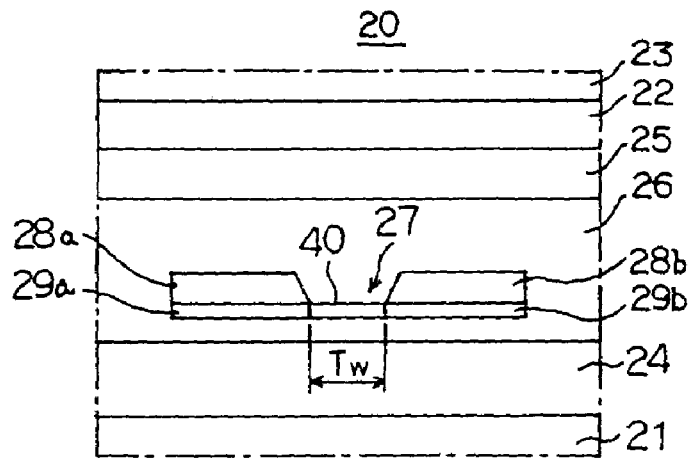
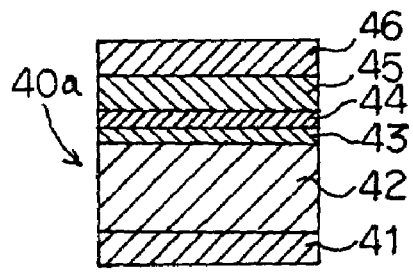
FIG. 5A
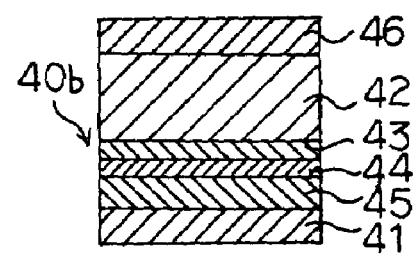
FIG. 5B
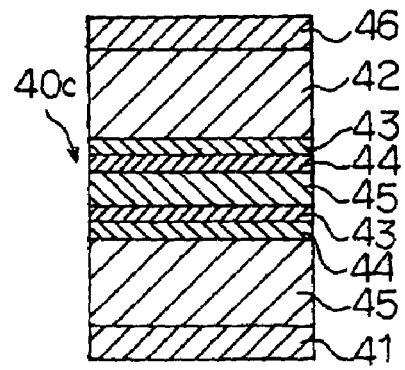
FIG. 5C

HELICAL SCAN TAPE SYSTEM WITH PARTICULAR DISTANCE BETWEEN MR ELEMENT AND SHIELD LAYERS

CROSS REFERENCE TO RELATED APPLICATIONS

The present invention contains subject matter related to Japanese Patent Application JP 2004-259838 filed in the Japanese Patent Office on Sep. 7, 2004, the entire contents of which being incorporated herein by reference.

BACKGROUND OF THE INVENTION

1. Field of the Invention

The present invention relates to a helical scan tape system, which is data storage with terabyte-class data storage capacity.

2. Description of the Related Art

A significant increase in the amount of information with developments of computers and the internet may require a data storage device having higher capacity and used for backing up the information. Examples of the data storage device include hard disk drives (HDDs) and storage tapes. To achieve such devices having higher capacities, surface recording density may be required to be increased. Examples of methods for increasing the surface recording density include a process of increasing track recording density by narrowing a recording wavelength; and a process of increasing the density in the track direction by narrowing a track pitch.

Read/write systems in tape streamers are divided into two: helical scanning employed in videocassette recorders, digital data storage (DDS), and advanced intelligent tapes (AIT); and linear scanning, in which digital signals are written and read by sliding a plurality of magnetic heads disposed in the transverse direction on a long magnetic tape in the longitudinal direction, employed in digital linear tape (DLT), linear tape-open (LTO), and the like.

To increase the recording density, Co-based magnetic tapes having a track recording density significantly higher than those of metal particle tapes (MP tapes) and produced by oblique evaporation have been increasingly used, thereby increasing not only the track recording density but also the storage capacity.

Among tapes used in the tape streamers, which are used for backups and archives, the magnetic tapes produced by oblique evaporation will be mainly used in the future because of high recording density. The magnetic layers of the magnetic tapes produced by oblique evaporation are formed by reactive vacuum deposition employing the oblique evaporation technique. The direction of inclined columns in the magnetic layer (easy magnetization direction) is not the in-plane direction but the oblique direction inclined relative to the in-plane direction. Thus, the high-output direction (forward direction) and the low-output direction (backward direction) are present depending on the traveling direction of the magnetic heads that record signals. In Japanese Unexamined Patent Application Publication No. 2003-59007, the magnetic tape produced by oblique evaporation is applied to the linear scanning read/write system. However, the magnetic tape produced by oblique evaporation is mainly applied to the helical scanning system, in which the traveling direction is a predetermined direction.

SUMMARY OF THE INVENTION

However, large-capacity HDDs each having a capacity of several hundred gigabytes are now available, and thus a huge system for data backups can be constructed, but is expensive, with the redundant array of independent disks (RAID). On the other hand, a magnetic tape is advantageous in that a recording capacity per cassette capacity is large. However, a single HDD now has a capacity of several hundred gigabytes. Therefore, the system using the magnetic tape may be required to have a capacity greater than several hundred gigabytes. Consequently, tape storage having terabyte-class data storage capacity is urgently necessary to be realized.

It is desirable to provide a helical scan tape system for terabyte-class data storage with a magnetic tape.

According to an embodiment of the present invention, there is provided a helical scan tape system including a magnetoresistive head; and a magnetic recording medium having a magnetic layer formed by oblique evaporation on a long nonmagnetic support, a signal being read with the magnetoresistive head by helical scanning, wherein the track width of the magnetoresistive head is 0.5 to 0.8 µm, the distance between shields is 0.13 to 0.145 µm, and sensitivity is 1,862 µVp-p or more.

According to another embodiment of the present invention, in the helical tape system described above, the thickness of the magnetic layer is in the range of 35 to 45 nm.

According to an embodiment of the present invention, a data storage system having a recording capacity of 1 TB or more can be provided.

BRIEF DESCRIPTION OF THE DRAWINGS

FIG. 4 is an end view of the GMR head as seen from the surface brought into slidable contact with a medium;

FIG. 5A is a cross-sectional view showing a bottom spin-valve structure in a spin-valve film constituting the GMR head;

FIG. 5B is a cross-sectional view showing a top spin-valve structure in the spin-valve film constituting the GMR head;

FIG. 5C is a cross-sectional view showing a dual spin-valve structure in the spin-valve film constituting the GMR head;

DESCRIPTION OF THE PREFERRED EMBODIMENTS

Figure 1:
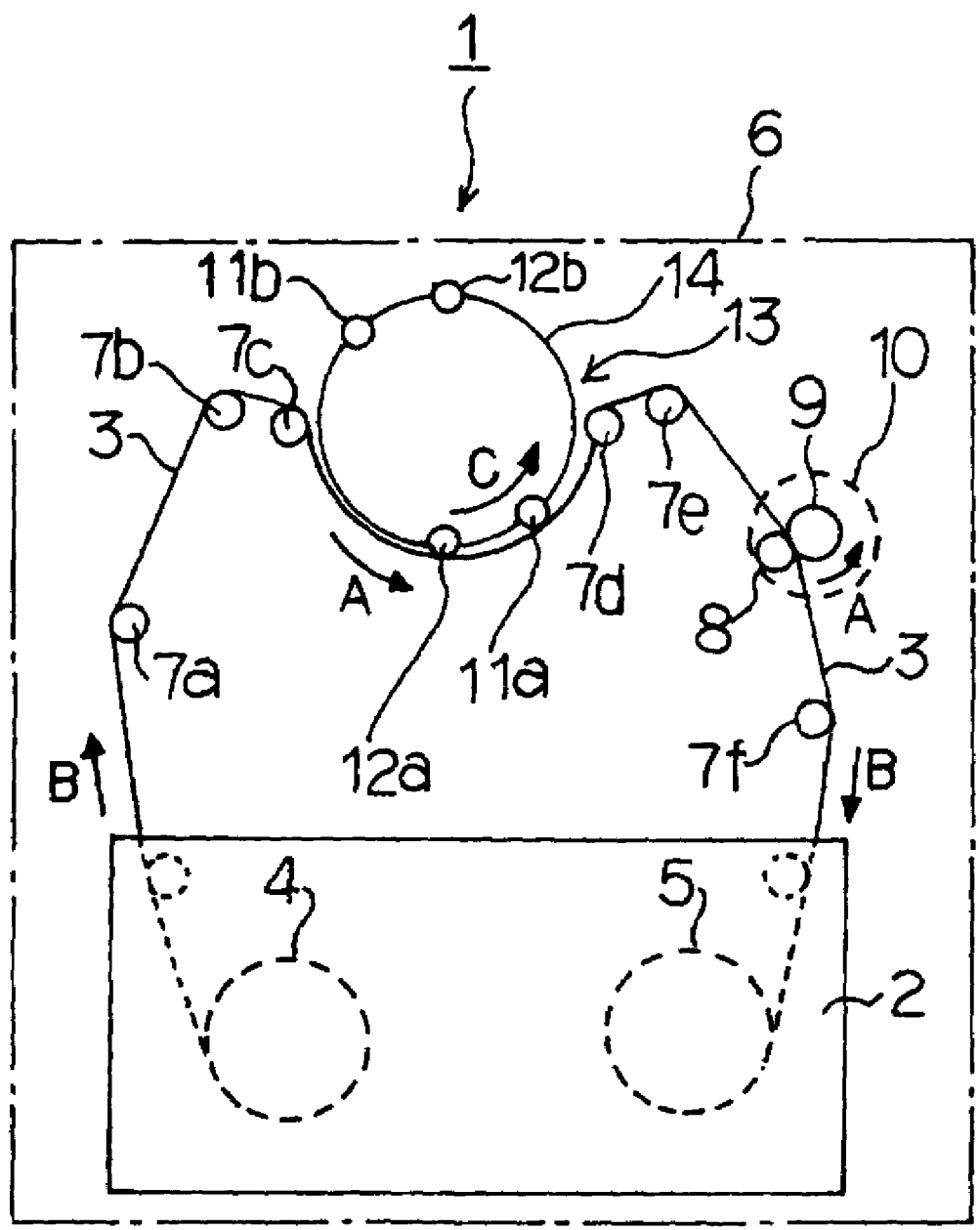
FIG. 1 is a schematic plan view of a helical scan tape system according to an embodiment of the present invention.

The inventor has been studying the conditions of a medium (magnetic tape) and a readout head used for a helical scan tape system with terabyte-class storage capacity.

Surface recording density, which is an index of a recording capacity, is determined by track recording density and a track pitch. A reduction in track pitch causes the deterioration of a signal-to-noise ratio (S/N ratio). To compensate the deterioration, the carrier-to-noise ratio (C/N ratio) in the medium might be required to be increased.

In order to increase the track recording density, the frequency characteristics of the magnetic tape may be required to be improved. If the frequency characteristics of the readout head are inferior to that of the magnetic tape, the track recording density depends on the frequency characteristics of the readout head. Thus, in order to increase the track recording density, it is an important factor to improve the frequency characteristics of the readout head. To improve the frequency characteristics of the readout head, when a magnetoresistive head, such as an anisotropic magnetoresistive head (AMR head) or a giant magnetoresistive head (GMR head), is used, the distance between shields should be decreased.

That is, in present circumstances, the surface recording density of the system has been increased year after year by a reduction in track pitch and an increase in track recording density. Since a reduction in track width causes a deterioration in S/N ratio, the development has proceeded so that the C/N ratio of the magnetic tape can be increased. To increase track recording density, the development has proceeded so that the frequency characteristics can be improved. To improve the frequency characteristics, there have been advancements in a reduction in the thickness of the magnetic layer of the magnetic tape. Furthermore, the development has proceeded so that coercivity Hc is also increased. With respect to the readout head, the distance between the shields has been important for improving the frequency characteristics in the AMR head or the GMR head, similar to the gap length of a known metal ring head.

In this way, to improve the frequency characteristics of the tape system, it may be necessary to improve the frequency characteristics of both the readout head and the magnetic tape. Even if the readout head or the magnetic tape is inferior to the frequency characteristics compared with that of the other, it is difficult to improve the frequency characteristics of the system. Furthermore, although only the frequency characteristics are improved, there may be no point if a waveform is not identified in reading data after equalization. In magnetic recording, the waveform changes into a sinusoidal wave by decreasing the wavelength because of interference. A further decrease in wavelength results in a reduction in output while the waveform is maintained in the sinusoidal wave. When the output level is close to the noise level, the output waveform is not distinguished from the noise, thus resulting in difficulty of readout.

The present inventor has conducted studies to increase the capacity of the helical scan tape system based on these concepts.

A helical scan tape system according to an embodiment of the present invention will be described below.

FIG. 1 is a schematic view of a helical scan tape system according to an embodiment of the present invention.

In a helical scan tape system 1, information signals are recorded on or read from a magnetic tape 3 in a tape cassette 2 by helical scanning. The tape cassette 2 includes a feed reel 4 for feeding the magnetic tape 3, a take-up reel 5 for taking up the magnetic tape 3 fed from the supply reel 4, the supply reel 4 and the take-up reel 5 being disposed rotatably.

The helical scan tape system 1 includes a tape cassette 2 detachable main body 6. The main body 6 includes a plurality of guide rollers 7a to 7f for guiding the magnetic tape 3 between the supply reel 4 and the take-up reel 5 in loading the tape cassette 2.

A pinch roller 8 through which the magnetic tape 3 is threaded, the pinch roller 8 serving as a transferring unit for transferring the tape, a capstan 9 in which the magnetic tape 3 is pinched between the pinch roller 8 and the capstan 9, and a capstan motor 10 for rotating the capstan 9 are disposed between the guide rollers 7e and 7f. The capstan 9 is rotated by the capstan motor 10 in the direction indicated by arrow A shown in FIG. 1 while the magnetic tape 3 is pinched between the pinch roller 8 and the capstan 9. Thus, the tape is transferred at a predetermined rate and tension in the direction indicated by arrow B shown in FIG. 1.

A head drum 13, which serves as a read/write unit, including a pair of write heads 11a and 11b and a pair of readout heads 12a and 12b is disposed between the guide roller 7c and 7d. The magnetic tape 3 is drawn with the guide rollers 7a to 7f from the tape cassette 2 and transferred in the direction indicated by arrow B shown in FIG. 1 while the magnetic tape 3 is wound on the head drum 13 at an angular range of 180° in the form of a helix.

Figure 2:
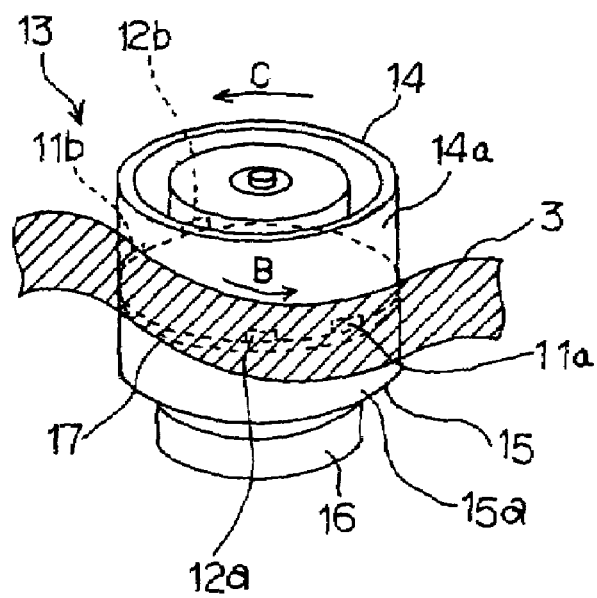
FIG. 2 is a perspective view illustrating a drum head.

As shown in FIGS. 1 and 2, the head drum 13 includes a rotating drum 14, a fixed drum 15, the rotating drum 14 being vertically combined with the fixed drum 15, and a driving motor 16 for rotating the rotating drum 14. The head drum 13 is slightly tilted relative to the base of the main body 6 while the central axes of these components coincide with each other.

Among these components, the fixed drum 15 constituting the lower section of the drum is fixed on the base of the main body 6. A lead guide 17 for guiding the magnetic tape 3 is provided on a cylindrical periphery 15a. The magnetic tape 3 is transferred along the lead guide 17, i.e., the magnetic tape 3 is transferred in a slanting direction relative to the rotational direction of the rotating drum 14.

On the other hand, the rotating drum 14, which is constitutes the upper section of the drum, having substantially the same diameter as that of the fixed drum 15 and is rotatably disposed. The rotating drum 14 is rotated in the direction indicated by arrow C shown in FIGS. 1 and 2 by the driving motor 16 disposed below the fixed drum 15.

The pair of write heads 11a and 11b for writing signals on the magnetic tape 3 and the pair of readout heads 12a and 12b for reading signals from the magnetic tape 3 are attached on the periphery of the rotating drum 14 which is adjacent to the periphery of the fixed drum 15.

Each of the write heads 11a and 11b is an inductive head including a pair of magnetic cores connected via the magnetic gap and coils wound around the magnetic cores. The write heads 11a and 11b are disposed at a central angle of 180° on the basis of the rotation center of the rotating drum 14. The write gaps of the write heads 11a and 11b slightly protrude in the outward direction from the periphery of the rotating drum 14. In order to perform azimuth recording, each of the write heads 11a and 11b is disposed so that each write gap is tilted in accordance with an azimuth angle relative to the direction substantially perpendicular to the traveling direction of the magnetic tape 3. Furthermore, the write heads 11a and 11b are disposed so that the azimuth angles are in reverse phase.

On the other hand, each of the readout heads 12a and 12b is a magnetoresistive head (hereinafter referred to as "MR head") including a magnetoresistive element (hereinafter referred to as "MR element") that serves as a detecting element for detecting signals from the magnetic tape 3. The readout heads 12a and 12b are disposed at a central angle of 180° on the basis of the rotation center of the rotating drum 14. The readout gaps of the readout heads 12a and 12b slightly protrude in the outward direction from the periphery of the rotating drum 14. In order to read signals written by azimuth recording, each of the readout heads 12a and 12b is disposed so that each readout gap is tilted in accordance with an azimuth angle relative to the direction substantially perpendicular to the traveling direction of the magnetic tape 3. Furthermore, the readout heads 12a and 12b are disposed so that the azimuth angles are in reverse phase.

In the head drum 13, the magnetic tape 3 wound around the periphery 14a of the rotating drum 14 and the cylindrical periphery 15a of the fixed drum 15 is transferred in the direction indicated by arrow B shown in FIG. 2. At the same time, the rotating drum 14 is rotated by the driving motor 16 in the direction indicated by arrow C shown in FIG. 2, thereby bringing the pair of write heads 11a and 11b and the pair of readout heads 12a and 12b into slidable contact with the magnetic tape 3. As a result, signals are written or read.

To be specific, in writing, the write head 11a applies a magnetic field in response to a recording signal on the magnetic tape 3 to form a recording track having a predetermined track width, and the write head 11b applies a magnetic field in response to a recording signal on a position adjacent to this track the magnetic tape 3 to form a recording track having a predetermined track width. These write heads 11a and 11b repeatedly form recording tracks, and thus the signals are continuously written on the magnetic tape 3.

On the other hand, in reading, the readout head 12a detects the signal magnetic field from the recording track recorded by the write head 11a, and the readout head 12b detects the signal magnetic field from the recording track recorded by the write head 11b. These readout heads 12a and 12b repeatedly detect a signal magnetic field from the recording tracks, and thus the signals are continuously read from the magnetic tape 3.

Figure 3:
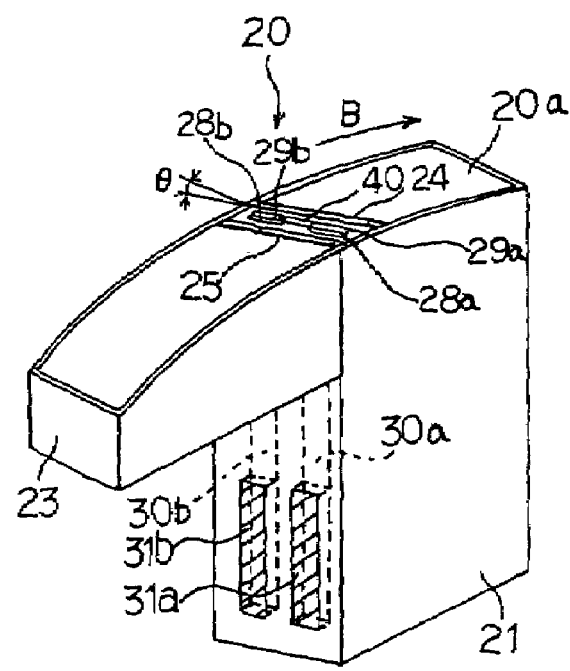
FIG. 3 is a perspective view illustrating a giant magnetoresistive head (GMR head)

A magnetoresistive head 20, which is shown in FIGS. 3 and 4, applicable to an embodiment of the present invention will be described below.

This magnetoresistive head 20 is what is called a giant magnetoresistive head (hereinafter referred to as "GMR head") including a giant magnetoresistive element (hereinafter referred to as "MR element") using a spin-valve film functioning as a magnetic sensor for detecting a magnetic signal from the magnetic recording medium.

The GMR head 20 has higher sensitivity and higher readout output than those in inductive heads and anisotropic magnetoresistive heads and is thus suitable for high-density recording. Therefore, in the helical scan tape system 1, the GMR head 20 is applied to the pair of readout heads 12a and 12b, and thus recording can be performed with higher sensitivity.

To be specific, each of the readout heads 12a and 12b includes the GMR head 20 formed by thin-film forming technique, such as plating, sputtering, or vapor deposition, on a first core element 21, and a second core element 23 provided above the GMR head 20 with a protective film 22. Furthermore, in the readout heads 12a and 12b, a sliding surface 20a for being brought into slidable contact with the magnetic tape 3 is a substantially arc-shaped surface curved along the traveling direction of the magnetic tape 3 indicated by arrow B shown in FIG. 3. Each GMR head 20 is disposed so that each readout gap, which protrudes in the outward direction from the sliding surface 20a, is tilted in accordance with an azimuth angle θ relative to the direction substantially perpendicular to the traveling direction of the magnetic tape 3.

These readout heads 12a and 12b have the same structure except that the azimuth angles are in reverse phase. Thus, in the following description, these readout heads 12a and 12b will be described collectively as the GMR head 20.

The GMR head 20 includes upper and lower magnetic shield layers 24 and 25, a gap layer 26 between the magnetic shield layers 24 and 25, and a GMR element 27 in the gap layer 26.

Each of the magnetic shield layers 24 and 25 is formed of a soft magnetic material film with a width sufficient to magnetically shield the GMR element 27. The GMR element 27 is disposed between the magnetic shield layers 24 and 25 with the gap layer 26 so that a magnetic field other than a target magnetic field among the signal magnetic fields on the magnetic tape 3 is not drawn into the GMR element 27. That is, in the GMR head 20, a magnetic field other than a target magnetic field is guided to the magnetic shield layers 24 and 25, and thus only a target signal is guided to the GMR element 27. This improves the frequency characteristics and readout resolution of the GMR element 27.

The gap layer 26 is formed of a nonmagnetic, nonconductive film that magnetically separates the GMR element 27 from the magnetic shield layers 24 and 25. The interval between the GMR element 27 and the magnetic shield layers 24 and 25 is defined as the "distance between shields". The distance between shields is 0.13 to 0.145 μm.

The GMR element 27 is formed of a spin-valve film 40 and uses what is called a giant magnetoresistive effect, in which the conductance of a sense current flowing through the spin-valve film 40 in the in-plane direction varies depending on the relative angle of magnetization in a pair of magnetic layer.

Examples of the spin-valve film 40 include the following: as shown in FIG. 5A, a bottom spin-valve film 40a having an underlying layer 41, an antiferromagnetic layer 42, a pinned magnetic layer 43, a nonmagnetic layer 44, a free magnetic layer 45, and a protective layer 46, stacked in that order; as shown in FIG. 5B, a top spin-valve film 40b having the underlying layer 41, the free magnetic layer 45, the nonmagnetic layer 44, the pinned magnetic layer 43, the antiferromagnetic layer 42, and the protective layer 46, stacked in that order; and, as shown in FIG. 5C, a dual spin-valve film 40c having underlying layer 41, antiferromagnetic layer 42, pinned magnetic layer 43, nonmagnetic layer 44, free magnetic layer 45, nonmagnetic layer 44, pinned magnetic layer 43, antiferromagnetic layer 42, and protective layer 46, stacked in that order.

Among these layers, the underlying layer 41 and the protective layer 46 are provided to prevent an increase in the resistivity of the spin-valve film 40 and composed of, for example, tantalum.

The antiferromagnetic layer 42 is preferably composed of PtMn that exhibits satisfactory corrosion resistance. In addition, examples of the material usable for the antiferromagnetic layer 42 include NiO, IrMn, CrMnPt, $\alpha$-$Fe_2O_3$, RhMn, NiMn, and PdPtMn, which have satisfactory corrosion resistance.

The pinned magnetic layer 43 and the free magnetic layer 45 are preferably composed of NiFe or CoNiFe, which exhibit satisfactory corrosion resistance and good soft magnetic characteristics. More preferably, between the pinned magnetic layer 43 and the free magnetic layer 45, one is composed of NiFe and another is composed of CoNiFe. Furthermore, the pinned magnetic layer 43 and the free magnetic layer 45 may have a laminated structure in which the alloy films are stacked. Alternatively, the pinned magnetic layer 43 and the free magnetic layer 45 may have a laminated ferrimagnetic structure in which the alloy films and nonmagnetic films composed of, for example, ruthenium are alternately stacked.

The nonmagnetic layer 44 is preferably composed of Cu, CuAu, or Au, which exhibits satisfactory corrosion resistance and high conductivity. More preferably, the nonmagnetic layer 44 is composed of Cu or CuAu capable of increasing the MR ratio and the output.

Here, in the GMR element 27, for example, the spin-valve film 40 includes the underlying layer 41 composed of Ta, the free magnetic layer 45 composed of $Ni_{80}Fe_{20}$ or $Co_{50}Ni_{30}Fe_{20}$, the nonmagnetic layer 44 composed of $Au_{70}Cu_{30}$, the pinned magnetic layer 43 composed of $Co_{50}Ni_{30}Fe_{20}$, the antiferromagnetic layer 42 composed of PtMn, and the protective layer 46 composed of Ta, stacked in that order.

In this spin-valve film 40, the pinned magnetic layer 43 is disposed adjacent to the antiferromagnetic layer 42, and thus the direction of the magnetization in the pinned magnetic layer 43 is fixed because of an exchange coupling magnetic field acting between the antiferromagnetic layer 42. On the contrary, the free magnetic layer 45 is magnetically separated from the pinned magnetic layer 43 with the nonmagnetic layer 44, and thus the magnetization direction in the free magnetic layer 45 can be readily changed in response to a weak external field.

Therefore, in this spin-valve film 40, applying an external field changes the magnetization direction in the free magnetic layer 45 depending on the magnitude and the direction of the applied external field. When the magnetization direction in the free magnetic layer 45 is the reverse direction (antiparallel) relative to the magnetization direction in the pinned magnetic layer 43, the resistance of the spin-valve film 40 is maximized. On the contrary, when the magnetization direction in the free magnetic layer 45 is the same direction (parallel) as that in the pinned magnetic layer 43, the resistance of the spin-valve film 40 is minimized.

In this way, since the electrical resistance of the spin-valve film 40 varies in response to applied external magnetic field, the spin-valve film 40 functions as a magnetic sensor for detecting a magnetic signal from the magnetic tape 3 by detecting the variation in resistance. In an embodiment of the present invention, by adjusting the structure and its composition of the spin-valve film 40, the readout sensitivity as the GMR head 20 is at least 1,862 μVp-p/μm (output level per micrometer in track width) at an LF.

To stabilize the operation of the GMR element 27, a pair of permanent-magnet films 28a and 28b for applying a bias magnetic field to the GMR element 27 is disposed at both ends of the spin-valve film 40 in the longitudinal direction as shown in FIGS. 3 and 4. The track width Tw of the GMR element 27 is defined by the gap between the permanent-magnet films 28a and 28b. The Tw is 0.5 μm to 0.8 μm.

Furthermore, resistance-reducing films 29a and 29b for reducing the resistance of the GMR element 27 are provided on the permanent-magnet films 28a and 28b, respectively.

The GMR element 27 further includes conducting portions 30a and 30b for feeding a sense current to the spin-valve film 40. An end of the conducting portion 30a is connected to the permanent-magnet film 28a and the resistance-reducing films 29a. An end of the conducting portion 30b is connected to the permanent-magnet film 28b and the resistance-reducing films 29b. The other ends of the conducting portions 30a and 30b are connected to external terminals 31a and 31b for connecting to an external circuit, respectively.

The protective film 22 covers the main surface of the first core element 21, including the GMR head 20, except for portions of the external terminals 31a and 31b exposed to the exterior. Furthermore, the protective film 22 bonds the first core element 21 including the GMR head 20 with the second core element 23.

The GMR head 20 shown in FIGS. 3 and 4, the GMR element 27 is shown in magnification in order that the features are easily understood. In fact, the GMR element 27 is very small compared with the first core element 21 and the second core element 23. In the sliding surface 20a, substantially only the upper end face of the GMR head 20 is exposed to the exterior at a position in which the first core element 21 and the second core element 23 are bonded together.

The resulting GMR head 20 is attached to a chip base (not shown), and the external terminals 31a and 31b are electrically connected to terminals provided on the chip base. The GMR head 20 provided on the chip base is attached to the rotating drum 14 shown in FIG. 2 as the readout head 12a or the readout head 12b.

Figure 6:
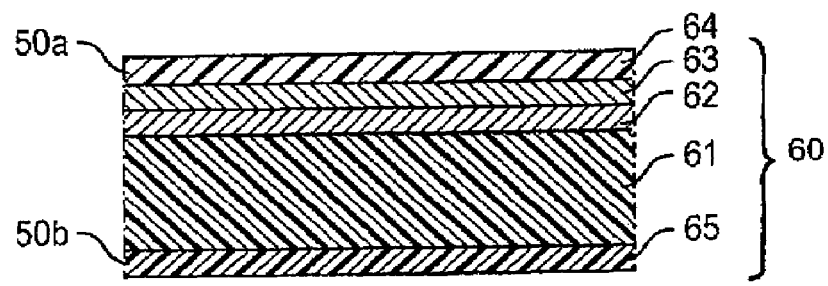
FIG. 6 is a schematic cross-sectional view showing a magnetic medium used in an embodiment of the present invention.

As shown in FIG. 6, a magnetic recording medium 60 used in an embodiment of the present invention will be described below.

This magnetic recording medium 60 is a magnetic tape produced by oblique evaporation, the magnetic tape including a magnetic metal film formed by oblique evaporation on a nonmagnetic support. This tape produced by oblique evaporation has satisfactory coercivity, excellent remanent magnetization, a good remanence ratio, and satisfactory electromagnetic conversion characteristics at shorter wavelength. In addition, a significantly thin magnetic layer can be formed, thus resulting in low demagnetization and low thickness loss in reading. Furthermore, a binder, which is a nonmagnetic material, is not required to be mixed in the magnetic layer, thus increasing packing density of the magnetic material to obtain large magnetization. Therefore, in the helical scan tape system 1, such a magnetic recording medium 60 is used as the magnetic tape 3 in the tape cassette 2, thereby improving electromagnetic conversion characteristics to obtain greater output.

To be more specific, the magnetic recording medium 60 includes a magnetic layer 62 having a magnetic metal thin film and a protective layer 63 for protecting the magnetic layer 62, stacked in that order on a nonmagnetic support 61 in the form of a tape.

Examples of the material of the nonmagnetic support 61 include polyesters such as poly(ethylene terephthalate) and polyethylene-2,5-naphthalate; polyolefins such as polypropylene; cellulose derivatives such as cellulose triacetate and cellulose diacetate; plastics such as polyamides, aramid resins, and polycarbonates. The nonmagnetic support may have a monolayer structure or a multilayer structure. Furthermore, a surface of the nonmagnetic support may be subjected to surface treatment such as corona discharge treatment. In addition, an organic layer, such as an adhesive layer, may be formed as an underlying layer.

The magnetic layer 62 is a magnetic metal thin film formed by a known process, such as vacuum deposition, sputtering, chemical vapor deposition (CVD), or ion plating. In particular, a magnetic metal thin film is preferably formed by vacuum deposition. The thickness of the magnetic metal thin film can be controlled by changing the feeding rate of the support. The remanent magnetization can be controlled by chaining the amount of oxygen fed during deposition. The magnetic metal thin film used for the magnetic layer 62 may be provided on, for example, an underlying layer composed of chromium. Examples of the material used for the underlying layer include CrTi, CrMo, and CrV in addition to chromium. Furthermore, the magnetic layer 62 may have a monolayer structure or a multilayer structure.

The thickness of the magnetic layer 62 is set in the range of 35 to 45 nm from the standpoint of the product Mr·t wherein Mr represents remanent magnetization and t represents thickness. This provides a distortion-free readout waveform, a large readout output, and a satisfactory S/N ratio.

These parameters, i.e., Mr and t, can be controlled by adjusting the conditions, such as the amount of oxygen fed during deposition and the feeding rate of the support. That is, a reduction in the amount of oxygen fed during deposition increases Mr, and an increase in the amount of oxygen fed reduces Mr. A reduction in the feed rate of the nonmagnetic support 61 during deposition increases t, and an increase in feed rate reduces t. Furthermore, Mr can be adjusted by surface oxidation after formation of the magnetic layer 62.

In the magnetic recording medium 60, coercivity Hc in the in-plane direction is preferably in the range of 100 to 160 kA/m. At a coercivity less than 100 kA/m, it is difficult to achieve low noise and high S/N ratio. At a coercivity exceeding 160 kA/m, it is difficult to sufficiently record to reduce the readout output. Consequently, the coercivity in the in-plane direction is set in the range of 100 to 160 kA/m, thereby achieving low noise, high S/N ratio, and high readout output.

The protective layer 63 may be composed of any material used for a general protective film for protecting a magnetic metal thin film. Examples thereof include diamond-like carbon (DLC), $CrO_2$, $Al_2O_3$, BN, Co oxides, MgO, $SiO_2$, $Si_3O_4$, $SiN_x$, SiC, $SiN_x$—$SiO_2$, $ZrO_2$, $TiO_2$, and TiC. The protective layer 63 may be a single film, a laminated film, or a composite film. The above-described surface electrical resistance can be adjusted by controlling the thickness of, for example, the DLC protective film provided on the magnetic metal thin film.

To improve running durability and corrosion resistance, the top-coat layer 64 is formed by applying a desirable hydrocarbon-based lubricant, a fluorocarbon-based lubricant, or the like. In general, a perfluoropolyether-based lubricant, which is one of fluorocarbon-based lubricants, is used.

A back-coat layer 65 is principally composed of, for example, a binder resin and an anti-static agent. Any of known binder resins and anti-static agents may be used. The back-coat layer 65 may have any thickness as long as the back side of the support is uniformly covered with the back-coat layer 65.

The magnetic recording medium 60 used in an embodiment of the present invention is not limited to the above-described structure, but may have not the protective layer 63 on the magnetic layer 62. In this case, the top-coat layer 64 is provided on the magnetic layer 62.

As has been described above, in the helical scan tape system 1, by combining the GMR head 20 and the magnetic recording medium 60, which are used in an embodiment of the present invention, it is possible to provide a novel, high-density read/write system and achieve a helical scan tape system with terabyte-class recording capacity.

With respect to a modulation method, the partial response class 4 (PR4) at 24-27 conversion may be used.

EXAMPLES

Example of the present invention will be described below.

(Determination of Distance Between Shields in GMR Head)

In a helical scan tape system shown in FIG. 1, the track recording densities D20, D15, and D10 of a magnetic tape were measured on a GMR head having a track width of 0.8 μm and a distance between the shields of 0.18 μm; and on a GMR head having a track width of 0.5 μm and a distance between the shields of 0.13 μm. A magnetic tape having a magnetic film 45 nm in thickness was used in this example. The magnetic film was composed of Co oxide-based material and produced by oblique evaporation.

The track recording densities D20, D15, and D10 were determined from roll-off curves obtained by measuring the magnetic tape with the GMR heads.

Figure 7:
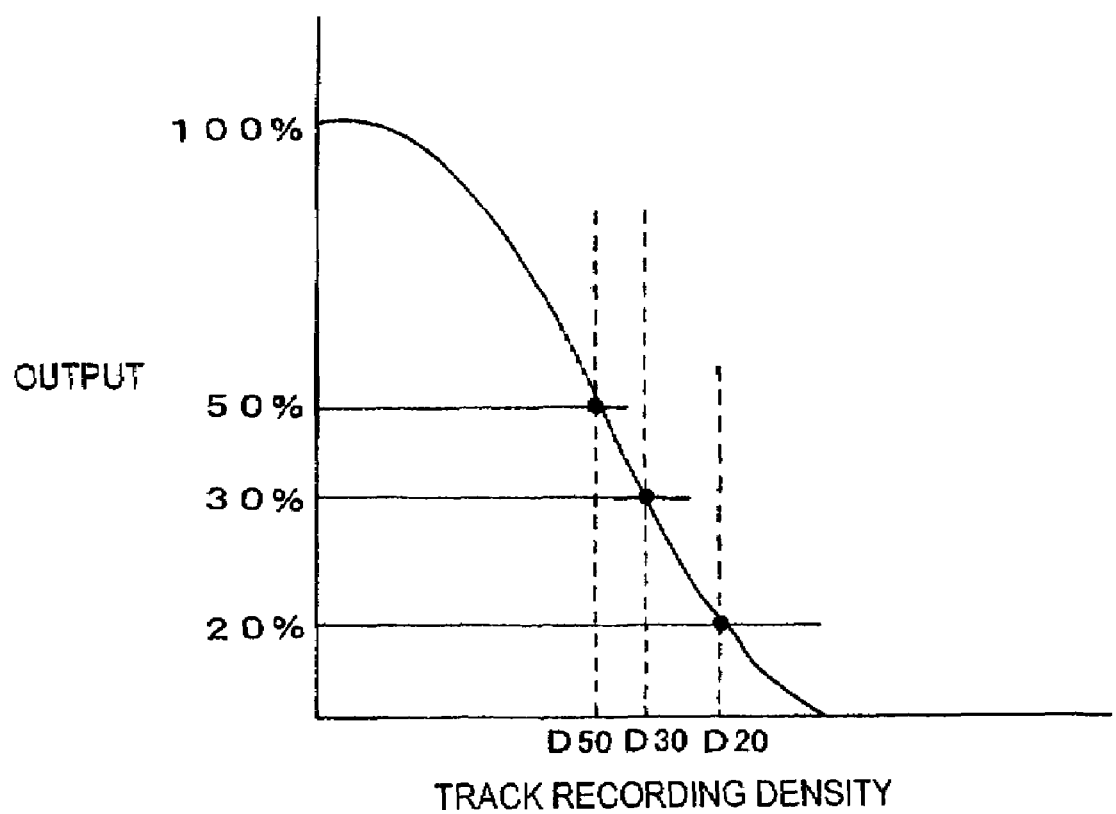
FIG. 7 is a theoretical roll-off curve.
Figure 8:
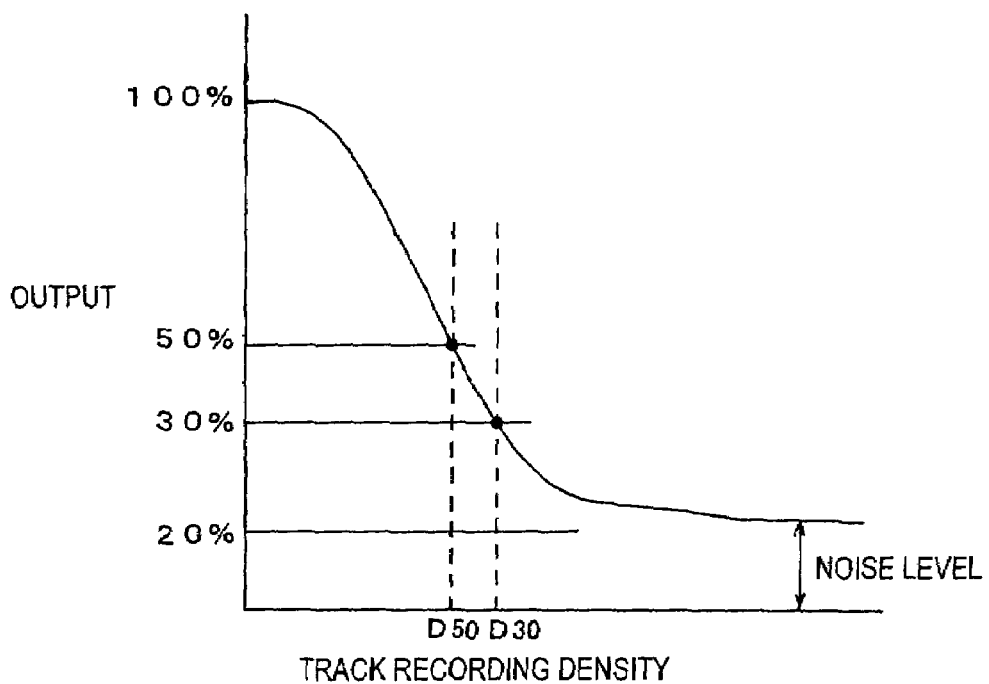
FIG. 8 is an actual roll-off curve.

The roll-off curve was determined by measuring the output level in terms of voltage at a predetermined frequency and shows a reduction in output. In theoretical, a curve as shown in FIG. 7 is obtained. In fact, a curve as shown in FIG. 8 is obtained because of noise. In this case, for example, a track recording density when the output is 50% of the maximum output (100%) is defined as D50. A track recording density when the output is 30% of the maximum output is defined as D30.

As shown in FIG. 7, in a substantially noise-free system, a signal can be determined even when the output level is several percent relative to the maximum output level. In fact, as shown in FIG. 8, the output level is saturated at a specific level because of noise. This saturation level is defined as noise level. Therefore, in FIG. 8, a signal can be determined to track recording density D30, but is difficult to be determined at D20 because the signal is buried in noise. That is, even if the track recording density at the D20 level is set, reliability of waveforms at high frequencies is degraded. Of course, improvement of the C/N ratio relatively reduces the noise level. Thus, signals can be determined at track recording densities D20 and D10. In this way, a recording density indicated by D30 or D20 can be used as an index for representing the limit of the track recording density. For example, in current HDDs having media produced by sputtering, the noise level is reduced so that a signal can be determined to about track recording density D10 in the roll-off curve.

TABLE 1

| Distance between shields | Track recording density (kFCI) | | |
|---|---|---|---|
| (μm) | D20 | D15 | D10 |
| 0.18 | 290 | 313 | 335 |
| 0.13 | 439 | 475 | 511 |

Table 1 shows the results of measurements using the above-described GMR heads.

As shown in Table 1, a reduction in the distance between the shields increases the track recording density. That is, Table 1 shows that the effect of the distance between the shields is large.

A frequency at a distance between shields of 0.13 μm and a track recording density of 475 kFCI (wavelength: 0.107 μm) was defined as ƒT, and a digital S/N ratio was measured. That is, 127-bit M-sequence (random signal) including seven zeros at a maximum was recorded, and then a readout wave was compared with a reference signal. After optimum equalization, an S/N ratio, i.e., digital S/N ratio, was calculated.

As a result, the digital S/N ratio was about 17.5 dB at a track width of 0.5 μm. The resulting digital S/N ratio was equivalent to 19.5 dB at a track width of 0.8 μm. This supports the fact that a satisfactory S/N ratio was obtained even at track recording density D15 (15% in output level relative to the maximum output level) shown in Table 1.

Next, if the assumption is made that the recording-track width of a recording head is 1.5 μm corresponding to the readout head with a readout-track width of 0.8 μm, the surface recording density can be achieved to be about 6.4 Gbits/inch$^2$ at 423 kFCI (376 kbits at 8-9 conversion).

Figure 9:
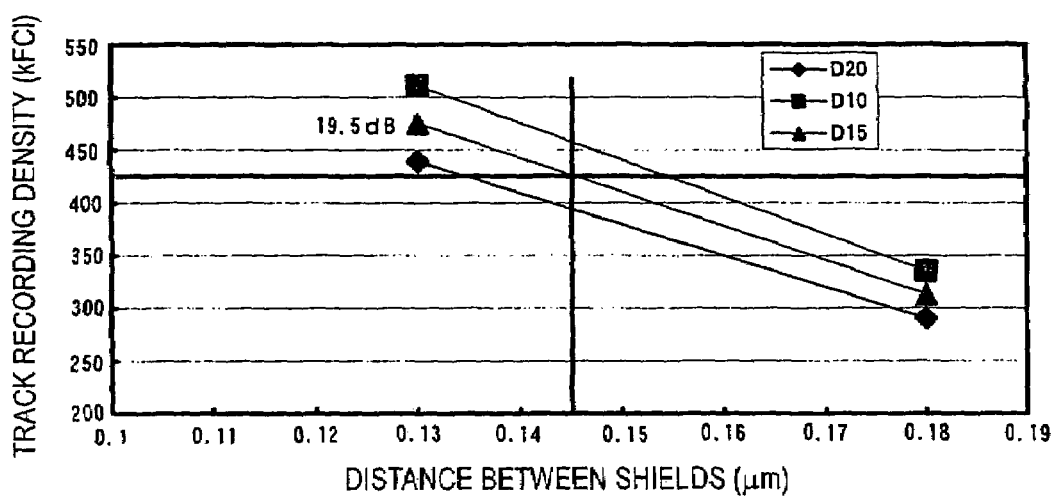
FIG. 9 is a graph showing the relationship between the track recording density and the distance between shields in an example.

If the assumption is made that a magnetic tape having a width of 8 mm and a length of 240 m is used for a tape cassette (cartridge), the storage capacity is 1 TB per tape cassette (cartridge). As shown in FIG. 9 which is the plot of Table 1, the distance between shields when the track recording density is 423 kFCI at D15 is 0.145 μm. When the distance between shields is set at 0.13 μm, the system can operate without problems. However, in fact, a reduction in the distance between shields may reduce sensitivity. Thus, from the standpoint of cost and sensitivity, it is important that the distance between shields be increased as much as possible to the extent that the system can operates without problems.

(Determination of Sensitivity of GMR Head)

A simulation was performed on sensitivity.

Figure 10:
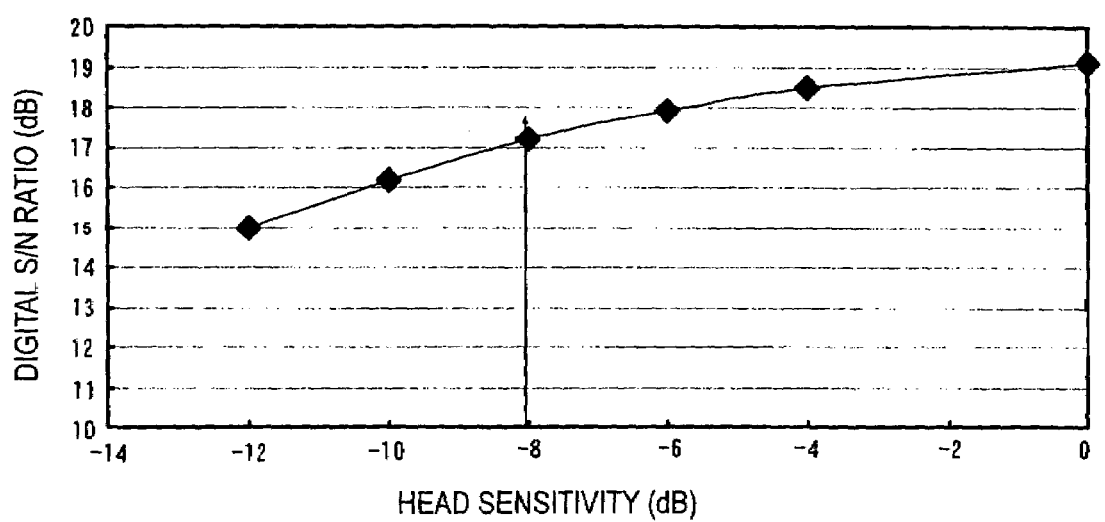
FIG. 10 is a graph showing the relationship between the head sensitivity and the digital signal-to-noise ratio (S/N) in an example.

The sensitivity of the GMR head with a track width of 0.5 μm was measured to be 4,680 μVp-p at LF. In this measurement, a relative peripheral velocity between the GMR head and the magnetic tape was 3.33 m/s. However, in a practical system, the relative peripheral velocity is 20 m/s. Thus, a deterioration in S/N ratio is estimated at 0.4 dB. Therefore, 0.4 dB was subtracted from the above-described digital S/N ratio, i.e., 19.5 dB, to provide 19.1 dB, which was defined as a reference. Then, in view of the deterioration of the sensitivity of the head, the digital S/N ratio was calculated again. FIG. 10 shows the results. The resulting digital S/N ratio was already corrected for peripheral velocity, i.e., the resulting digital S/N ratio was a value at a peripheral velocity of not 3.33 m/s but 20 m/s.

The digital S/N ratio when the system can operate is set at 17 dB, the allowable level of the deterioration of the head sensitivity is −8 dB. Therefore, the limit of the sensitivity of the GMR head is 1,862 μVp-p.

(Determination of Thickness of Magnetic Tape)

The frequency characteristics of a magnetic tape including a magnetic layer 28 nm in thickness was measured using a GMR head having a track width of 0.5 μm and a distance between shields of 0.13 μm, the magnetic layer being smaller than that of the above-described magnetic tape.

As a result, the resulting frequency characteristics were substantially the same as those in the case of the magnetic layer 45 nm in thickness, and there was no significant difference. This means that, in fact, the difference between the media is not detected because the characteristics of the head are dominant. Furthermore, when the thickness of the magnetic layer was 28 nm, Mr·t was decreased. Thus, the noise level was decreased, thereby enhancing susceptibility to a system noise. As a result, the S/N ratio was reduced by about 0.5 dB.

Thus, Mr·t may be required to be increased by about 2 dB. In this case, the thickness of the magnetic layer is calculated to be 35 nm.

Therefore, to achieve the above-described surface recording density, the thickness of the magnetic layer is preferably 35 to 45 nm.

Consequently, according to an embodiment of the present invention, there is provided a helical scan tape streamer with a storage capacity of 1 TB, wherein when the recording track width is 1.5 μm, the track recording density is 423 kFCI, and the readout track width is 0.5 to 0.8 μm, the distance between the shields of the GMR head is 0.13 to 0.145 μm, the readout sensitivity is 1,862 μVp-p/μm (output level per micrometer of the track width) at LF, the magnetic tape is produced by oblique evaporation, and the thickness of the magnetic layer in the magnetic tape is 35 to 45 nm.

It should be understood by those skilled in the art that various modifications, combinations, sub-combinations and alterations may occur depending on design requirements and other factors insofar as they are within the scope of the appended claims or the equivalents thereof.

What is claimed is:

1. A helical scan tape system, comprising:
   a magnetoresistive head including a magnetoresistive element disposed in a nonmagnetic nonconductive gap layer, the gap layer being disposed between an upper and lower magnetic shield layer; and
   a magnetic recording medium including a magnetic layer formed by oblique evaporation over a long nonmagnetic support, a signal being read with the magnetoresistive head by helical scanning;
   wherein a track width of the magnetoresistive head is 0.5 to 0.8 μm;
   a distance between the magnetoresistive element and the upper magnetic shield layer is 0.13 to 0.145 μm and a distance between the magnetoresistive element and the lower magnetic shield layer is 0.13 to 0.145 μm.

2. The helical scan tape system according to claim 1, wherein the magnetoresistive head is a giant magnetoresistive head.

3. The helical scan tape system according to claim 2, wherein readout sensitivity of the GMR head is 1,862 μVp-p or more, a thickness of the magnetic layer of the magnetic recording medium is 35 to 45 nm, and coercivity Hc in the in-plane direction of the magnetic recording medium is in a range of from 100 to 160 kA/m.

4. The helical scan tape system according to claim 2, wherein a pair of permanent magnetic films are formed adjacent opposing longitudinal ends of the GMR element.

5. The helical scan tape system according to claim 2, wherein a resistance-reducing film is formed on each of said pair of permanent magnet films.

6. The helical scan tape system according to claim 5, wherein readout sensitivity of the GMR head is 1,862 μVp-p or more, a thickness of the magnetic layer of the magnetic recording medium is 35 to 45 nm, and coercivity Hc in the in-plane direction of the magnetic recording medium is in a range of from 100 to 160 kA/m.

7. The helical scan tape system according to claim 6, wherein said magnetic recording medium is a magnetic tape.

8. The helical scan tape system according to claim 2, wherein said GMR element is substantially planar.

9. The helical scan tape system according to claim 8, wherein readout sensitivity of the GMR head is 1,862 μVp-p or more, a thickness of the magnetic layer of the magnetic recording medium is 35 to 45 nm, and coercivity Hc in the in-plane direction of the magnetic recording medium is in a range of from 100 to 160 kA/m.

10. The helical scan tape system according to claim 9, wherein said magnetic recording medium is a magnetic tape.

11. The helical scan tape system according to claim 1, wherein the magnetic recording medium includes:
    a protective layer; and
    a top coat layer, the protective layer and the top coat layer being provided in that order on the magnetic layer.

12. The helical scan tape system according to claim 1, wherein said magnetic recording medium is a magnetic tape.

* * * * *